US011222003B1

(12) United States Patent
Jones et al.

(10) Patent No.: US 11,222,003 B1
(45) Date of Patent: Jan. 11, 2022

(54) EXECUTING TRANSACTIONS FOR A HIERARCHY OF DATA OBJECTS STORED IN A NON-TRANSACTIONAL DATA STORE

(71) Applicant: Amazon Technologies, Inc., Seattle, WA (US)

(72) Inventors: Shawn Jones, Vancouver (CA); Eric Samuel Stone, Seattle, WA (US); Benjamin Jeffery, Vancouver (CA); Kunal Chopra, Vancouver (CA); Mingzhe Zhu, Burnaby (CA); Alexander Kulikov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 434 days.

(21) Appl. No.: 15/279,335

(22) Filed: Sep. 28, 2016

(51) Int. Cl.
*G06F 15/16* (2006.01)
*G06F 16/23* (2019.01)

(52) U.S. Cl.
CPC ................. *G06F 16/2365* (2019.01)

(58) Field of Classification Search
CPC ................................................ G06F 17/30371
See application file for complete search history.

(56) References Cited

U.S. PATENT DOCUMENTS

| 9,734,187 | B2 | 8/2017 | Fuchs | |
| 2004/0122897 | A1* | 6/2004 | Seelemann, II | ........ G06F 16/25 |
| | | | | 709/204 |
| 2006/0242122 | A1* | 10/2006 | DeVorchik | ............ G06F 16/148 |
| 2012/0011098 | A1* | 1/2012 | Yamada | ............... G06F 11/1662 |
| | | | | 707/623 |
| 2014/0304245 | A1* | 10/2014 | Fuchs | ................. G06F 16/2365 |
| | | | | 707/703 |
| 2016/0217159 | A1* | 7/2016 | Dahan | ................... G06F 16/256 |
| 2016/0275089 | A1* | 9/2016 | Soundararajan | ........ G06F 16/18 |

OTHER PUBLICATIONS

Peter Bailis, "Scalable Atomic Visibility with RAMP Transactions," Apr. 7, 2014 (Year: 2014).*
P. Bailis, A. Fekete, A. Ghodsi, J.M. Hellerstein, I. Sotica, "Scalable Atomic Visibility with RAMP Transactions," SIGMOD 2014, pp. 27-38.

* cited by examiner

*Primary Examiner* — Alex Gofman
(74) *Attorney, Agent, or Firm* — Robert C. Kowert; Kowert, Hood, Munyon, Rankin & Goetzel, P.C.

(57) ABSTRACT

A transaction directed to a hierarchy of data objects stored in a non-transactional data store may be executed. The transaction may be received and description of the transaction stored in a parent data object of the hierarchy. Upon storing the description of the transaction, the transaction may be acknowledged as committed. Access requests for the hierarchy of data objects may be serviced by accessing the description of the transaction and applying to child data objects in the hierarchy returned for servicing a query directed to the hierarchy. A new transaction that is received may initiate application of the transaction according to the description in the parent data object with respect to child data objects.

20 Claims, 8 Drawing Sheets

EXECUTING TRANSACTIONS FOR A HIERARCHY OF DATA OBJECTS STORED IN A NON-TRANSACTIONAL DATA STORE

BACKGROUND

Database systems managing large amounts of data on behalf of users may receive a high volume of request traffic to access data and to manage the storage of data. Different mechanisms for structuring, arranging, or otherwise making data available may be implemented in order to service requests. In some scenarios, database systems may support the atomic performance of a group of updates to data maintained in the database, known as transactions. Implementing transactions, however, can also increase complexity and reduce performance of the database system. Therefore, some database systems do not offer transaction capabilities for updates to data. While the use of such database systems or other data stores that do not offer transaction capabilities is typically avoided by users that wish to perform transactions, the performance characteristics of non-transactional data stores may incentivize those users to find alternative mechanisms for leveraging the performance of non-transaction data stores.

Figure 1:
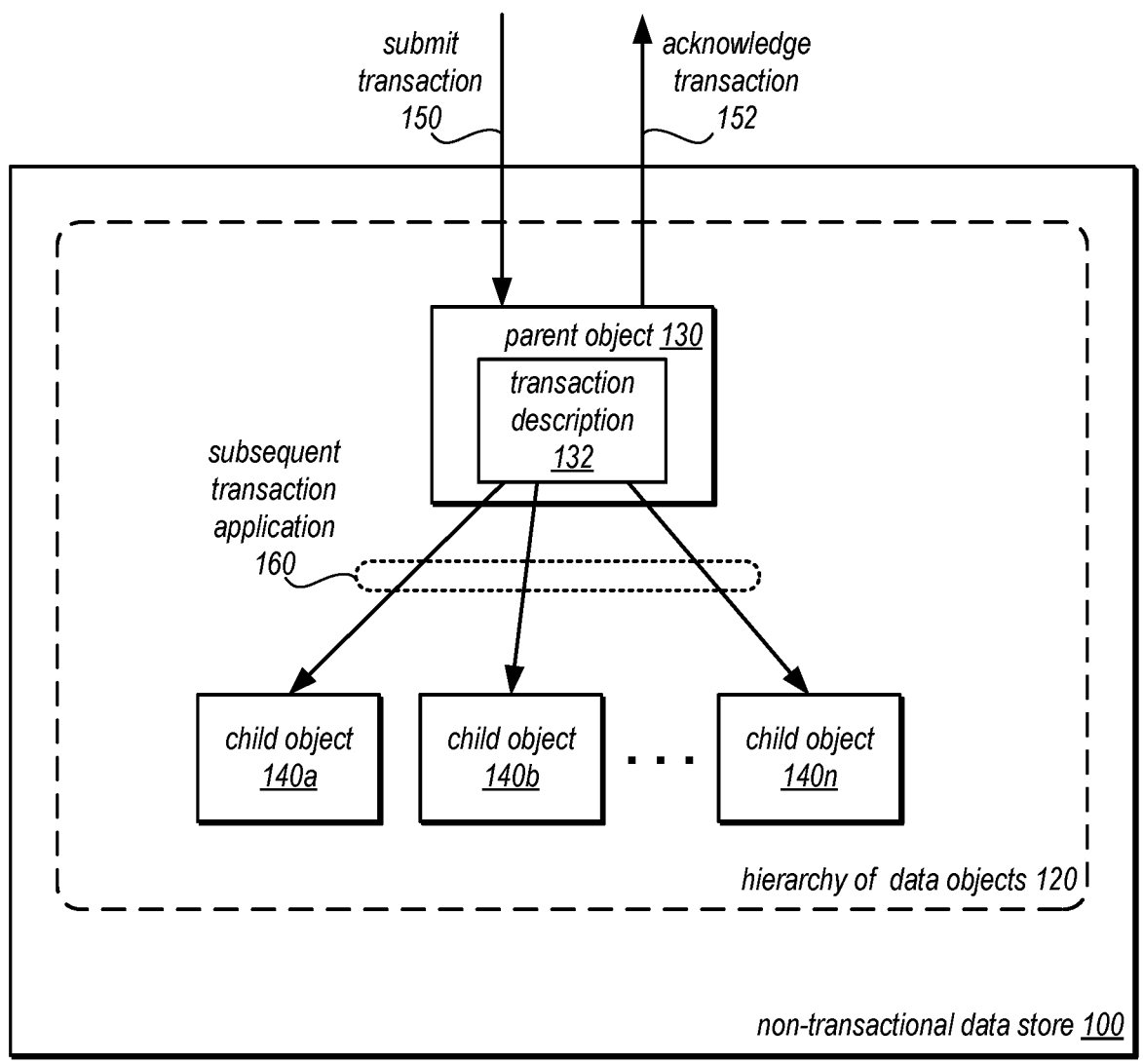
FIG. 1 is a logical block diagram illustrating executing transactions for a hierarchy of data objects at a non-transactional data store, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement executing transactions for a hierarchy of data objects maintained in a non-transactional data store. Data stores, such as database systems, file systems, object-based or key-value stores, may offer users a variety of different features for updating and accessing data. Transactions are one such feature and allow for a number of changes to data stored in a data store to be atomically performed so that either the group of changes in the transaction all complete successfully or none complete successfully. However, not all data stores offer transactional capability. For some data stores, the structure or schema of the data may make implementing transactions too complex or costly in terms of performance. For these non-transactional data stores, users are left to design interactions that do not rely upon transactions.

Some types of updates, however, may not be implemented without transactions. For instance, large collections of related items stored across one or more multiple locations (e.g., tables or directories) may need updates performed atomically. Without transactions, it may be unlikely that updates made across the collection of items will complete without exposing some reader of the data to an inconsistent view of an incomplete set of updates. Hierarchies of data objects may be a collection of data objects stored across one or multiple locations. The hierarchy may include relationships amongst the data objects including a parent object that identifies all other data objects in the hierarchy related to the parent object (e.g., via parent-child relationships). The other data objects in the hierarchy, the child data objects may include various information against which it may be desirable to perform multiple updates without exposing an incomplete set of updates. Executing transactions across a hierarchy of data objects maintained in a non-transactional data store may be implemented to take advantage of the performance provided by a non-transactional data store without sacrificing the capability to implement transactions when desirable. Moreover, in various embodiments, the execution of transactions may occur external to the non-transactional data store so that no modifications to the non-transactional data store need be made in order to implement transactions.

FIG. 1 is a logical block diagram illustrating executing transactions for a hierarchy of data objects at a non-transactional data store, according to some embodiments. Non-transactional data store 100 may store a hierarchy 120 of data objects, such as parent object 130 and child objects 140*a* through 140*n*. Transactions may be executed against the hierarchy of data objects 120 by storing transaction description 132 as part of submitting a transaction 150 to the hierarchy 120. Transaction description 132 may describe the changes that are to be applied as part of the transaction, such as changes to update data, add child data objects, or remove child data objects.

Because transaction description 132 resides in parent object 130, access requests for the hierarchy 120 may be able to access and determine a state of the hierarchy 120 via the transaction description 132, without waiting on all of the changes described in the transaction 150 to be applied across the different child objects 140. Instead, the transaction may be subsequently applied 160 (e.g., flushed) when a new transaction is submitted, applying the changes to the various child objects, while the parent object is still accessible to service queries by making the transaction description available 132 until completely applied. Thus, while a transaction is applied 160, a query can obtain the transaction description 132 and query child objects and resolve whether or not the transaction has yet to be applied to individual child objects 140. For those child objects 140 not yet updated, the query results based on the data read from the child data objects 140 may be updated using transaction description 132 so that the query results may be based on a consistent view of hierarchy 120, even if the changes are not yet applied at all of the affected child objects 140. Moreover, because a transaction is subsequently applied 160, the transaction itself may be acknowledged 152 once the transaction description is stored.

Please note that previous descriptions are not intended to be limiting, but are merely provided as logical examples of executing transactions for non-transactional data stores. Different numbers or arrangements of data objects, communications or the implementation of non-transactional data stores may be implemented.

This specification begins with a general description of non-relational storage service that is a non-transactional data store. Then various examples of the storage service are discussed, including different components/modules, or arrangements of components/module, that may be employed as part of implementing the storage service as well as a transaction engine for executing transactions at the non-relational storage service. A number of different methods and techniques to execute transactions for hierarchies of data objects at non-transactional data stores are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
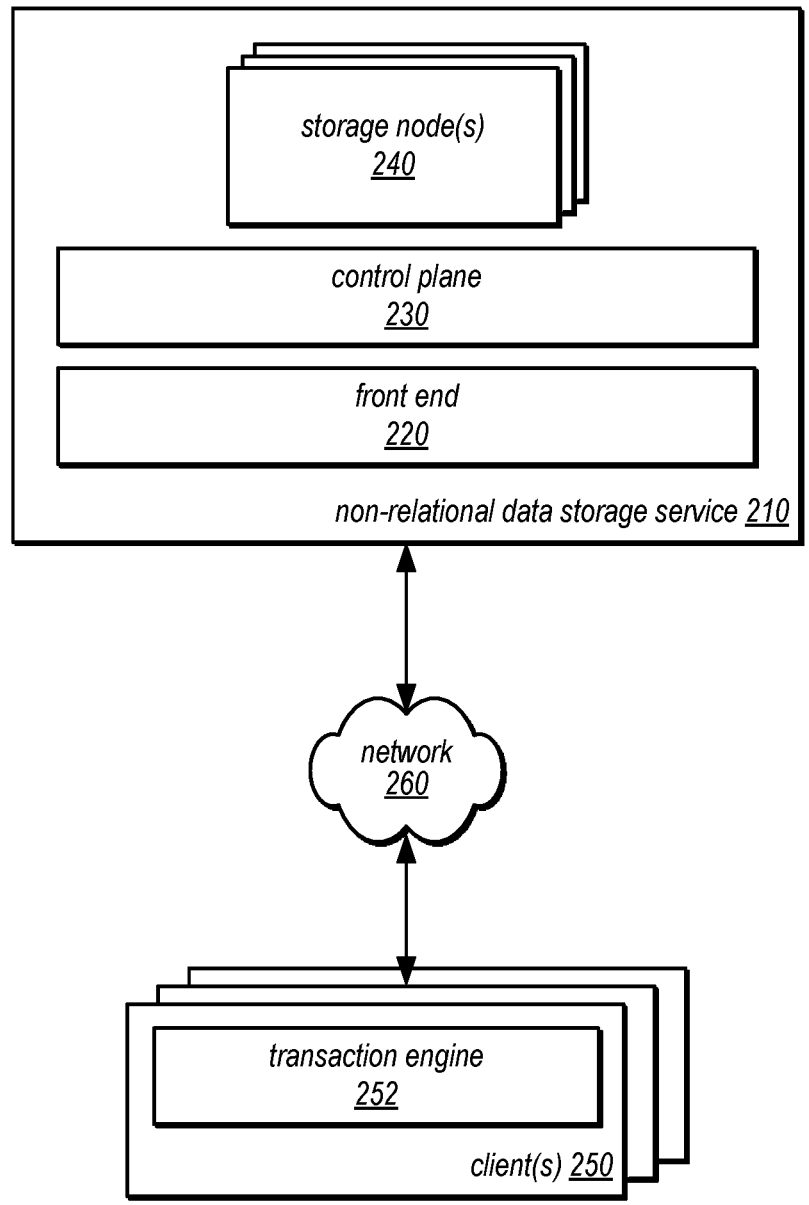
FIG. 2 is a block diagram illustrating a non-relational data storage service that does not offer transactions and clients that implement a transactional engine to execute transactions for a hierarchy of data objects stored in the non-relational data storage service, according to some embodiments.

FIG. 2 is a block diagram illustrating a non-relational data storage service that does not offer transactions and clients that implement a transactional engine to execute transactions for a hierarchy of data objects stored in the non-relational data storage service, according to some embodiments. It is noted that where one or more instances of a given component may exist, reference to that component herein below may be made in either the singular or the plural. However, usage of either form is not intended to preclude the other. In various embodiments, the components illustrated in FIGS. 2-5B may be implemented directly within computer hardware, as instructions directly or indirectly executable by computer hardware (e.g., a microprocessor or computer system), or using a combination of these techniques. For example, the components of FIG. 2 may be implemented by a distributed system including a number of computing nodes (or simply, nodes), such as computing system 1000 in FIG. 8 described below. In various embodiments, the functionality of a given storage service system component may be implemented by a particular computing node or may be distributed across several computing nodes. In some embodiments, a given computing node may implement the functionality of more than one storage service system component.

Generally speaking, clients 250 may encompass any type of client configurable to submit web services requests to network-based storage service 210 via network 260. For example, a given storage service client 250 may include a suitable version of a web browser, or a plug-in module or other type of code module configured to execute as an extension to or within an execution environment provided by a web browser to provide database or data storage service clients (e.g., client applications, users, and/or subscribers) access to the services provided by non-relational data storage service 210. Alternatively, a storage service client 250 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 250 may be an application configured to interact directly with non-relational data storage service 210. In various embodiments, storage service client 250 may be configured to generate web services requests according to a Representational State Transfer (REST)-style web services architecture, a document- or message-based web services architecture, or another suitable web services architecture.

In some embodiments, storage service client 250 may be configured to provide access to non-relational data storage service 210 to other applications in a manner that is transparent to those applications. For example, storage service client 250 may implement transaction engine 252 which may be a transaction library, plug in or other component be configured to provide storage transaction capabilities according to the various techniques discussed below with regard to FIGS. 3-5B leveraging the capabilities offered by non-relational data storage service 210. Storage service clients 250 may convey web services requests to and receive responses from non-relational data storage service 210 via network 260. In various embodiments, network 260 may encompass any suitable combination of networking hardware and protocols necessary to establish web-based communications between clients 250 and non-relational data storage service 210. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and non-relational data storage service 210 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and non-relational data storage service 210. It is noted that in some embodiments, storage service clients 250 may communicate with non-relational data storage service 210 using a private network rather than the public Internet. For example, clients 250 may be provisioned within the same enterprise as the data storage service (and/or the underlying system) described herein. In such a case, clients 250 may communicate with non-relational data storage service 210 entirely through a private network 260 (e.g., a LAN or WAN that may use Internet-based communication protocols but which is not publicly accessible).

Generally speaking, non-relational data storage service 210 may be configured to implement one or more service endpoints configured to receive and process web services requests, such as requests to access tables maintained on behalf of clients/users by a database service or a data storage service, and/or the items and attributes stored in those tables. For example, non-relational data storage service 210 may include hardware and/or software configured to implement various service endpoints and to properly receive and process HTTP-based web services requests directed to those endpoints. In one embodiment, non-relational data storage service 210 may be implemented as a distributed system configured to receive web services requests from clients 210 and to forward them to various components that collectively implement a data storage system for processing. In other embodiments, non-relational data storage service 210 may be configured as a number of distinct systems (e.g., in a cluster topology) implementing load balancing and other request management features configured to dynamically manage large-scale web services request processing loads.

Non-relational data storage service 210 may include front end 220 (which may be configured to receive, authenticate, parse, throttle and/or dispatch service requests, among other things) and control plane 230 (which may be configured to provide a variety of visibility and/or control functions, as described in more detail herein). Non-relational data storage service 210 may also implement a plurality of storage node node(s) 240, each of which may maintain and manage one or more tables on behalf of clients/users or on behalf of the data storage service (and its underlying system) itself. Some of the functionality provided by each of these types of components is described in more detail herein, according to various embodiments. Note that in some embodiments, non-relational data storage service 210 may include different versions of some of the components illustrated in FIG. 2 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 2. Note also that in various embodiments, one or more database instances may be implemented on each of the storage nodes 240, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, non-relational data storage service 210 may be configured to support different types of web services requests. For example, in some embodiments, non-relational data storage service 210 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments non-relational data storage service 210 may implement various client management features. For example, non-relational data storage service 210 may coordinate the metering and accounting of client usage of web services, including storage resources, such as by tracking the identities of requesting clients 250, the number and/or frequency of client requests, the size of tables and/or items stored or retrieved on behalf of clients 250, overall storage bandwidth used by clients 250, class of storage requested by clients 250, and/or any other measurable client usage parameter. Non-relational data storage service 210 may also implement financial accounting and billing systems, or may maintain a database of usage data that may be queried and processed by external systems for reporting and billing of client usage activity. In some embodiments, non-relational data storage service 210 may include a lock manager and/or a bootstrap configuration (not shown).

In various embodiments, non-relational data storage service 210 described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, scan (e.g., list items) over the whole table, optionally filtering the items returned, and create one or more secondary indexes global to the whole table which may be used to perform different queries efficiently over particular attributes in the table that are used to create the secondary index.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, non-relational data storage service 210 described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

Front end 220 may perform parsing and/or throttling of service requests, authentication and/or metering of service requests, dispatching service requests, and/or maintaining a partition map cache. Additionally, front end 220 may include components that are common to multiple types of computing nodes that collectively implement Web services platform, such as a message bus and/or a dynamic configuration module.

Control plane 230 may provide visibility and control to system administrators, or to perform heat balancing, and/or anomaly control, and resource allocation. Control plane 230 may also include an admin console, through which system administrators may interact with the data storage service (and/or the underlying system). In some embodiments, admin console may be the primary point of visibility and control for the non-relational data storage service 210 (e.g., for configuration or reconfiguration by system administrators). For example, an admin console may be implemented as a relatively thin client that provides display and control functionally to system administrators and/or other privileged users, and through which system status indicators, metadata, and/or operating parameters may be observed and/or updated.

Storage node(s) 240 may include one or more modules configured to provide partition management, to implement replication and failover processes, and/or to provide an application programming interface (API) to underlying storage, to process client requests to get, put, delete, update, query, etc. As noted above, different storage nodes 240 may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a master node, performing special functions with regard to access requests directed toward the partition maintained by replica group 1. For replica group 2, however, storage node B may be the master node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

Storage nodes 240 may include a storage engine, which may be configured to maintain (i.e. to store and manage) one or more tables (and associated table data) in storage (which in some embodiments may be a non-relational database) on behalf of one or more clients/users.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Structured Query Language (SQL).

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited. These attributes may also be described by system resource metadata and anomalies between these attributes and system resource metadata may be detected.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

Multiple tables may store various data objects of a hierarchy of data objects. For example, a resource table may store child data objects describing resources, whereas another table may store child data objects describing policies. Transactions that are submitted by transaction engine 252 may make updates to changes across different tables. In some embodiments, no one table may store an entire hierarchy of data objects.

Figure 3:
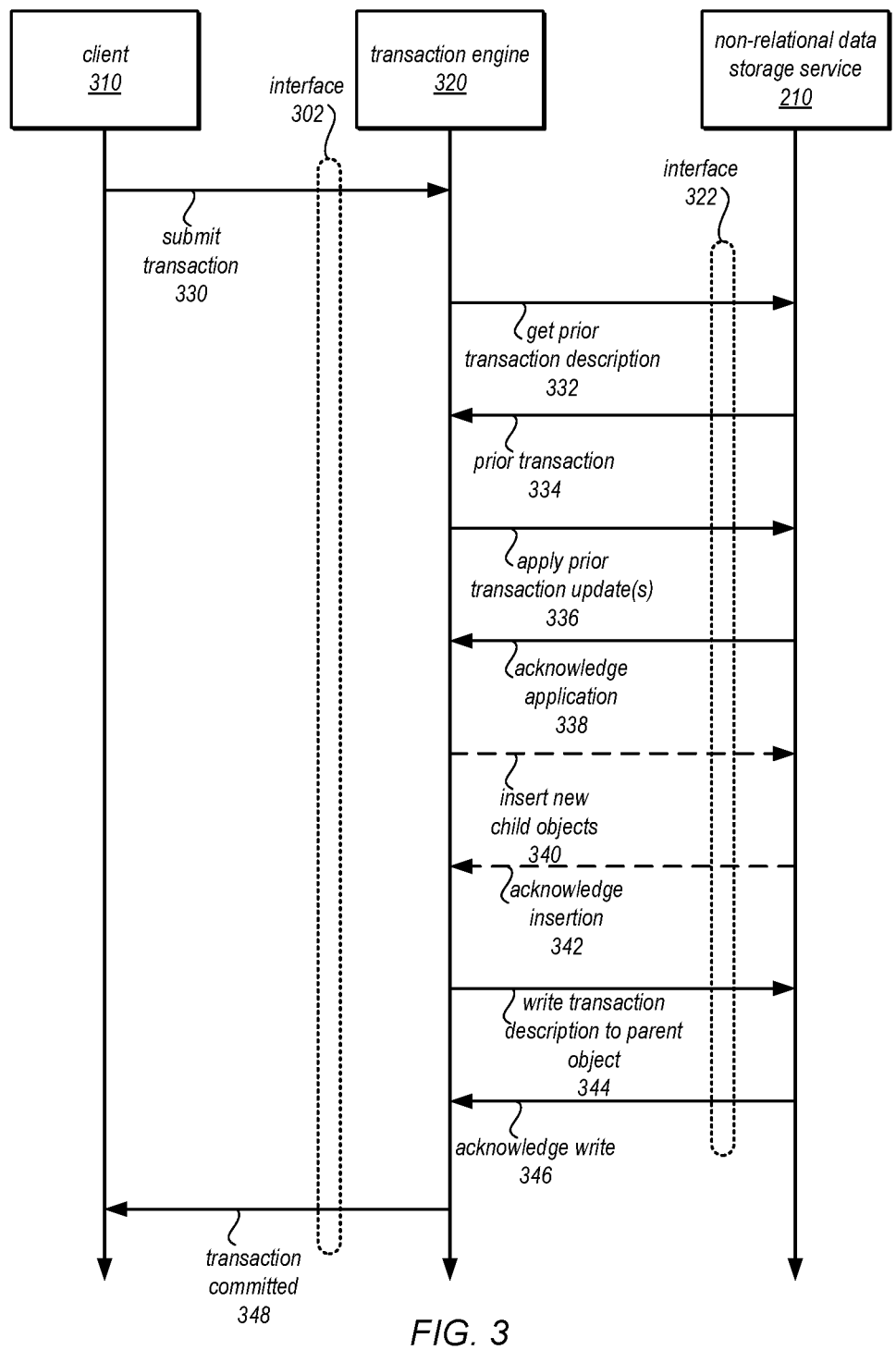
FIG. 3 is an example sequence diagram for submitting a transaction to a non-transactional data store, according to some embodiments.

FIG. 3 is an example sequence diagram for submitting a transaction to a non-transactional data store, according to some embodiments. Client 310 may interact with transaction engine 320 via interface 302. Interface 302 may be a programmatic interface, such as an Application Programming Interface (API) which may specify the format of requests like a transaction 330 or query 430 in FIG. 4. Client 310 may submit a transaction request 330 that specifies one or multiple changes to a hierarchy of data objects stored in non-relational data store 210, including changes to insert new child data objects, update or modify the values of child data objects, or delete child data objects.

In various embodiments, transaction engine 310 may flush a transaction that is currently stored in the parent data object. For example, transaction engine 320 may send a request to get a prior transaction's description 332 from the parent data object maintained in non-relational data storage service 210 via interface 322 (e.g., by sending a request to get a transaction description attribute in the parent item). Interface 322 may be an API, such as those discussed above with regard to FIG. 2 that allow clients to interact with non-relational data storage service 210. Transaction engine 320 may get the prior transaction description 334 from non-relational data storage service 210. According to the described changes transaction engine may send various requests to perform the described changes. For example, transaction engine 320 may send a request to apply updates to values of child data objects 336, which non-relational data storage service 210 may perform and acknowledge 338. Although not illustrated, in some embodiments, requests to delete data objects as described by the transaction may also be performed. Some updates may include identifying new child data objects inserted by the described transaction as committed. When performing updates, a transaction number matching the transaction number of the described transaction may be stored in the child data objects (indicating which transactions have been applied to the child data objects).

In some embodiments, the submitted transaction 330 may include requests to insert new child objects, illustrated by the dashed lines. In such embodiments, requests to insert the new child objects 340 into non-relational data store 210 may be performed prior to committing the transaction. The new child objects may be marked or identified as uncommitted.

Once updates for the described transaction are flushed, then a request to write the transaction description that was submitted (at 330) to the parent data object may be performed. In some embodiments, the write request may be conditional so that the request is only performed if a condition, such as the parent data object including a particular value (e.g., a random value) matches a value included in the write request. In this way, other write requests to the parent data object that successfully complete before write request 344 are not overwritten. If the condition is satisfied, non-relational data storage service 210 may send an acknowledgement of the write 346 to transaction engine 320, which in turn may acknowledge the transaction as committed.

Figure 4:
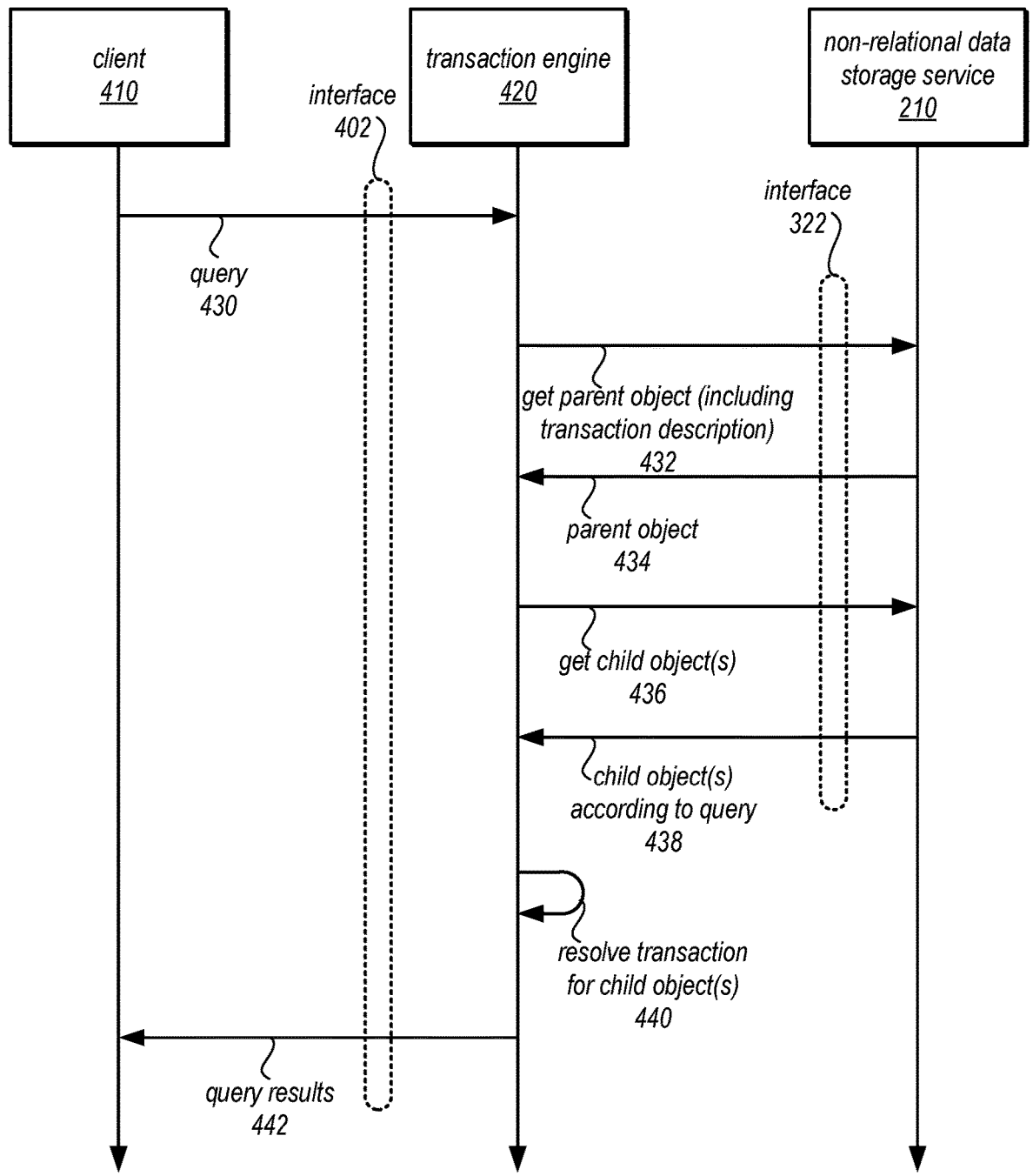
FIG. 4 is an example sequence diagram for processing queries directed to a non-transactional data store for which transactions have been executed, according to some embodiments.

FIG. 4 is an example sequence diagram for processing queries directed to a non-transactional data store for which transactions have been executed, according to some embodiments. Client 410 may submit a query 430 via interface 402 (e.g., similar to interface 302 in FIG. 3). The query may specify one or more predicates with respect to child data objects in the hierarchy. Transaction engine 420 may send a request via interface 322 to non-relational data storage service 210 get the parent object including any transaction description that may be present in the parent data object. Transaction engine 510 may also send a request to get the child object(s) 436 that satisfy the query. Non-relational data storage service 210 may return the requested data objects 438.

Transaction engine 420 may then evaluate the description of the transaction to determine whether the transaction applies to any of the obtained child objects. For any child objects updated by the transaction description, transaction engine my resolve 440 those child data objects and utilize the updated versions of the child data objects in order to service the query (e.g., execute or apply the updates described in the transaction to the retrieved child object(s)). Then transaction engine 420 may return the query results 442 to client 410.

Figure 5A:
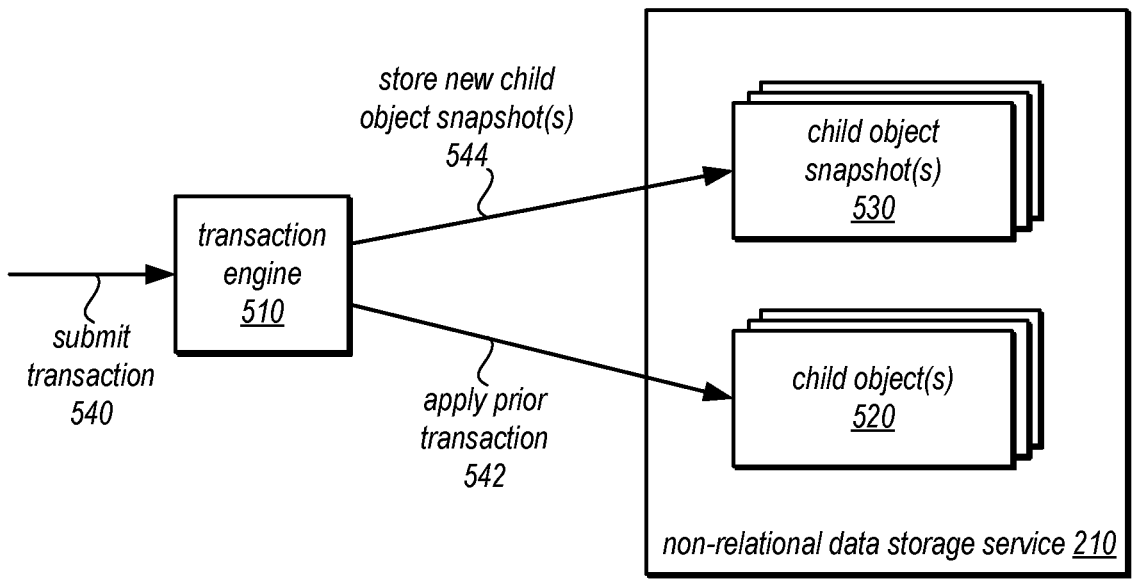
FIGS. 5A and 5B are logical block diagrams that illustrate maintaining snapshots of prior child data object versions for executing transactions, according to some embodiments.

In environments where many transactions and query requests are being directed to a hierarchy of data objects from multiple clients, some scenarios may occur that would create an inconsistent read between the obtaining of the transaction description and the resolution of the transaction with obtained child data objects for a query. For example, if a child object were returned 438 that included a version number higher than that of the transaction number obtained from the parent object (at 432), then the child objects are inconsistent with the version of the parent object. An inconsistent read exception or error would be triggered, and query 430 would fail. Other techniques may be implemented to correct inconsistent reads that are returned. For instance, FIG. 5A is a logical block diagram that illustrates maintaining snapshots of prior child data object versions for executing transactions, according to some embodiments. Maintaining snapshot(s) of prior versions of child data objects may allow for multiple version concurrency control to be implemented with respect to queries so that a version or snapshot of the hierarchy of data objects at the time a query is received may be preserved in order service the query, instead of rejecting the query as suffering from an inconsistency error.

In FIG. 5A, non-relational data storage service 210 maintains both child object(s) 520 in their current state as well as child object snapshot(s) 530 (e.g., as part of separate snapshot table for the hierarchy). For a transaction submitted 540 to transaction engine 510, the transaction engine 510 flushes the transaction to both child object(s) 520 and child snapshot object(s) 530, so that the transaction may be applied 542 to the current state of child object(s) and stored as new child object snapshot(s) 544 for those changes applied as part of the transaction. As with the changes to child data objects discussed above, the child object snapshot(s) 530 may have an associated transaction version number that may be used to determine which snapshots are consistent for servicing queries.

Figure 5B:
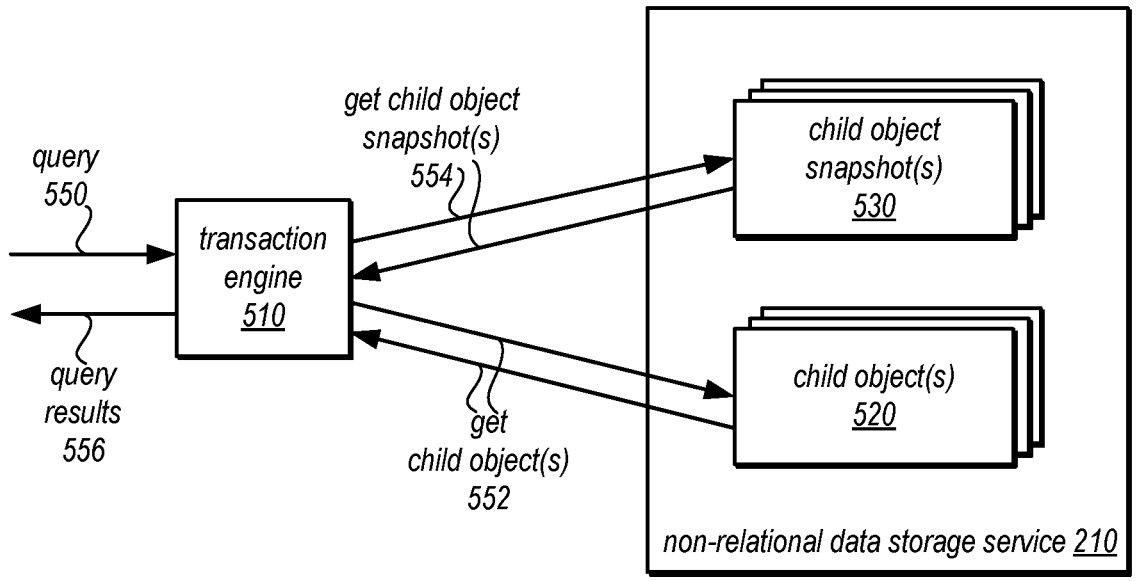

For example, in FIG. 5B query 550 is received at transaction engine 510. In order to service the query, transaction engine 510 obtains child object(s) 552 from non-relational data storage service 210. Upon evaluating the child object(s), one or more inconsistent child object(s) may be discovered (e.g., child objects with transaction version numbers later than a transaction version number determined for the query (e.g., by reading the parent data object). Transaction engine 510 may then get child data object snapshot(s) with transaction version numbers that are less than and closest to the transaction version number determined for the query. If the snapshots do not exist, then the child data objects did not exist at the time the query 550 was received. The snapshot(s) may then be used to generate query results 556 that are all consistent with the transaction version number determined for the query.

Figure 6:
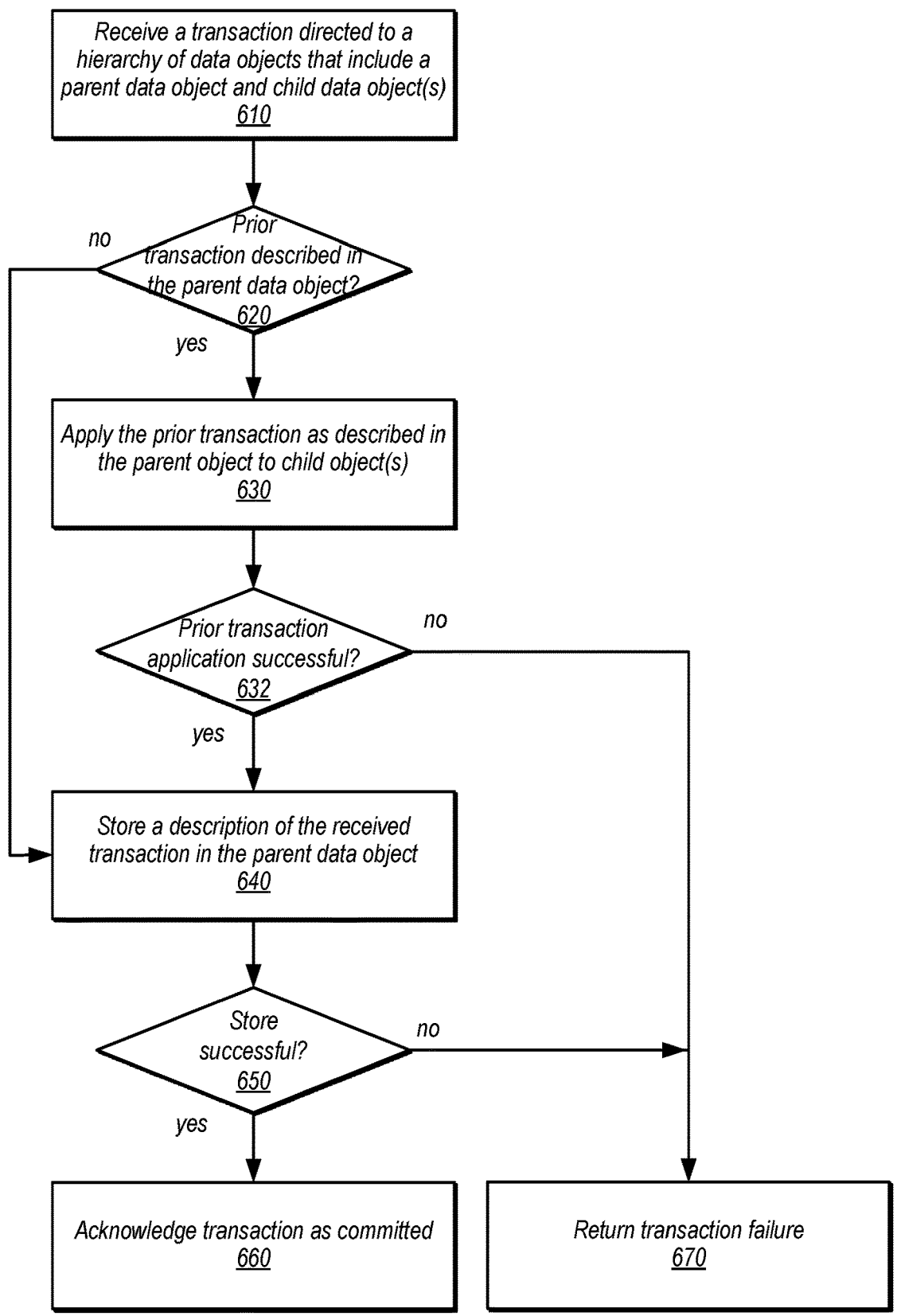
FIG. 6 is a high-level flowchart illustrating various methods and techniques to implement executing transactions for a hierarchy of data objects at a non-transactional data store, according to some embodiments.

The examples of executing transactions for a hierarchy of data objects maintained in a non-transactional data store as discussed above with regard to FIGS. 2-5B have been given in regard to a non-relational storage service. However, various other types of data stores, including relational data stores, may not support transactions and therefore the execution of transactions for a hierarchy of data objects may be implemented for these types of data stores as well. FIG. 6 is a high-level flowchart illustrating various methods and techniques to implement executing transactions for a hierarchy of data objects at a non-transactional data store, according to some embodiments. These techniques may be implemented a transaction engine as discussed above, as well as at systems or components separate from a client or storage engine, and thus the following discussion is not intended to be limiting as to the other types or configurations of transactional engines that may implement the described techniques.

As indicated at 610, a transaction may be received that is directed to a hierarchy of data objects including a parent data object and child data objects maintained in a non-transactional data store, in various embodiments. The transaction may specify one or multiple changes to make to one, multiple or all of the child data objects, as well as changes to the composition of the hierarchy, including changing relationships between data objects, inserting new data objects, or deleting current data objects, such as discussed above with regard to FIG. 3. When the transaction is received, the parent data object may be evaluated to determine whether a previously received transaction is described in the parent data object. For example, a predefined location, attributed, or filed in the parent data object may be read to check for a transaction description or null value. If no transaction description is present, then as indicated by the negative exit from 620, the description of the received transaction may be stored in the parent data object that describes the desired changes and includes a new transaction version number (which may be a monotonically increasing number). For example, a conditional write request may be performed to store the transaction description in the parent data object if a random value that was present in the parent data object is still the same. If so, then the write may be performed, storing the description in the parent data object and updating the random value with a new random value. If the random value is not the same (indicating that another writer has changed the parent data object prior to the storage request being received, then the storage request for the description may fail (as the write condition was not satisfied). As indicated in FIG. 6, if storage of the transaction description is successful, then the transaction may be acknowledged as committed. However, if the storage attempt fails, then a transaction failure may be returned, as indicated at 670.

If a transaction description is present in the parent data object, then the transaction described in the parent data object may be flushed (e.g., applied) to the hierarchy by updating the child nodes or performing other changes described by the transaction description, as indicated at 630. For instance, attribute value changes for child data nodes may be performed or child data nodes deleted. For those child nodes that are updated, a transaction version number matching the transaction version number in the transaction description may be stored (e.g., overwriting an existing transaction version number for the child data object). For those child data objects that were created by the transaction, the transaction version number may also be updated to match, changing an invalid transaction version number (indicating that the data page has not been committed) to a valid transaction number. If application of prior transaction fails to complete (e.g., due to an error communicating with the non-transactional data store), then, as indicated by the negative exit from 632, the transaction may be returned as a failure. However, if application of the described transaction is completed successfully, as indicated by the positive exit from 632, then the transaction description for the received transaction may be stored, as indicated at 640.

In some embodiments, transaction descriptions maintained in a parent data object may be asynchronously flushed without receiving another transaction. For example, a background process may periodically check a parent data object to determine whether a transaction description has been flushed. If not, then the background process may perform the various requests to the non-transactional data store to apply the described transaction, as discussed above.

In some scenarios, transactions may be committed to the non-transactional data store by successfully storing the transaction, but may not be successfully acknowledged to transaction engine that performed the storage request. In such scenarios, the transaction engine may retry to store the transaction and may discover based on the returned transaction version number and/or contents of the stored transaction description that the previous transaction completed. The transaction client may then acknowledge the transaction as committed.

Figure 7:
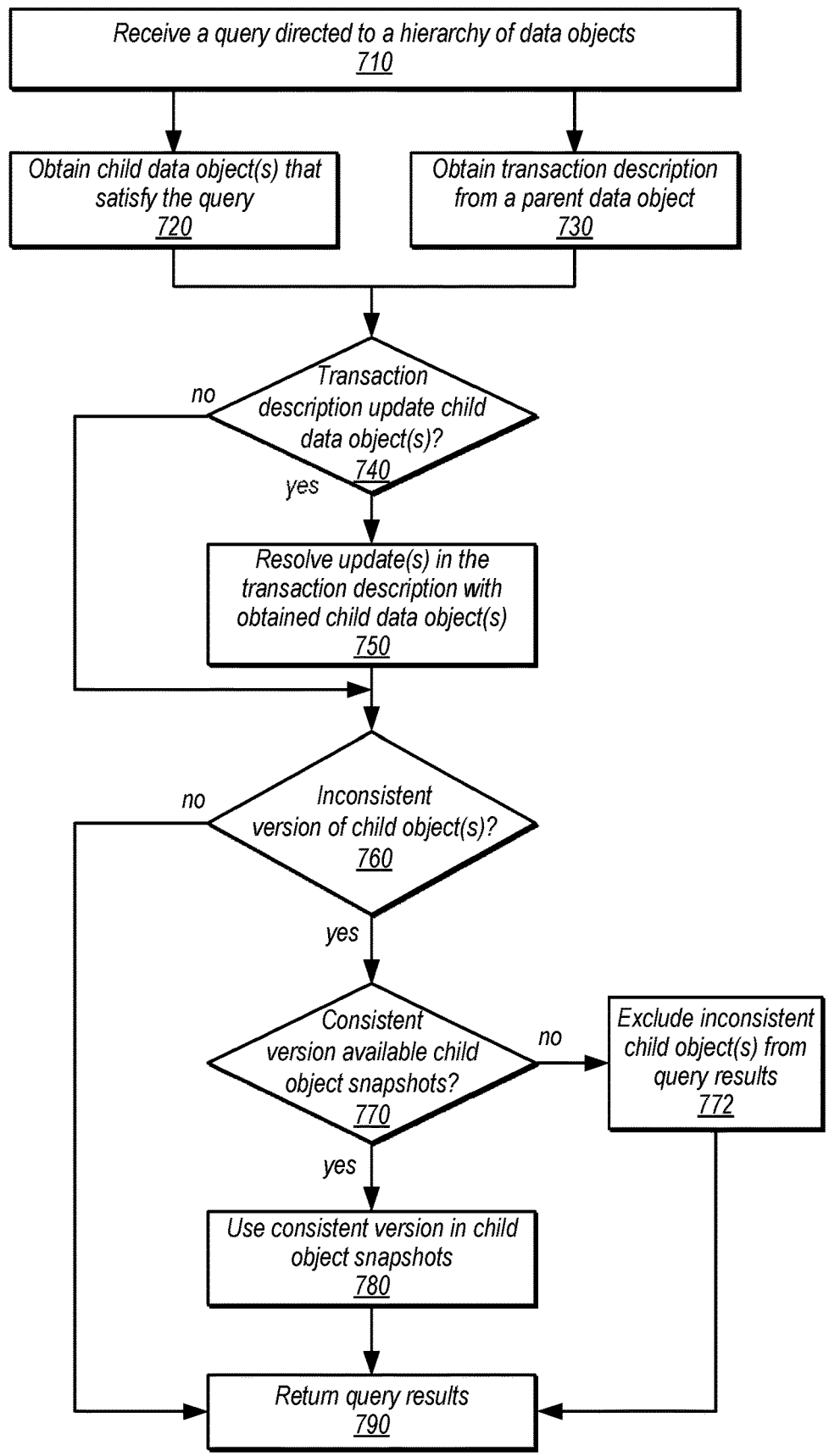
FIG. 7 is a high-level flowchart illustrating various methods and techniques to process queries directed to a hierarchy of data objects maintained a non-transactional data store for which transactions have been executed, according to some embodiments.

FIG. 7 is a high-level flowchart illustrating various methods and techniques to process queries directed to a hierarchy of data objects maintained a non-transactional data store for which transactions have been executed, according to some embodiments. As indicated at 710, a query may be received that is directed to a hierarchy of data objects. The query may be formatted or specified according to a programmatic interface (e.g., either for transaction engine or for the non-transactional data store maintaining the hierarchy). Query predicates included in the query may identify which child data objects may need to be evaluated and what desired information may be returned. For example, child data objects may have a different types and the query predicate may specify one (or multiple ones) of the types which are to be evaluated along with another data value or attribute of the data object that is to be retrieved.

As indicated at 720, child data object(s) that satisfy the query may be obtained. For example, a scan request, index evaluation, or other search technique may be implemented to locate those child data object(s) identified by a query predicate and/or that include specified data to be returned. The non-transactional data store may return those objects that satisfied query. Although not illustrated in FIG. 7, some child objects may be returned that were never committed to the non-transactional data store. As noted above in FIG. 3, insertions of new child data objects may occur prior to committing a transaction. When the new child data objects are inserted they may be marked or identified (e.g., by including an erroneous transaction value, like zero) as uncommitted. Unless the transaction that includes the insertion of the new child data object is committed, the child data object may never be changed from uncommitted to committed (e.g., by changing the transaction version number to match the transaction version number that inserted the child data object). If child data objects are returned by the non-transactional data store that satisfy the query predict and are marked or identified as uncommitted, then those uncommitted child data objects may be excluded from generating the query results, in some embodiments.

As indicated at 730, a transaction description from a parent data object may also be obtained, in various embodiments. For example, the parent data object may be read from the non-transactional data store and an attribute, field, or portion of the parent data object designated for transaction descriptions may be checked. While in some embodiments, the transaction description may be null (if there is no transaction to apply either because no transaction has been submitted/committed or because the transaction has already been flushed out to the child data objects), in other scenarios a transaction description may be present (even if the transaction description does not affect the results of the query).

As indicated at 740, the transaction description may be evaluated to determine whether the transaction updates the obtained child data objects. The transaction description, as noted above, may include a transaction version number. This transaction version number may be compared with transaction version numbers stored in the child data objects. If the transaction identifies the child data object, a comparison may be made between the transaction version number in the transaction description and the child data object. If the transaction version number is less than or equal to the transaction version then the transaction describes a change to the child data object that can be applied. If the transaction description does indicate a change or update applied to one of the obtained child data objects, then as indicated by the positive exit from 740, the update(s) in the transaction may be resolved with the child data object(s) (e.g., by executing or applying changes described in the transaction description to the child data object(s)). For example, if a data value changes or a child data object is deleted, then the obtained child data will be treated as if the data value is changed or deleted. Note that no changes may be made to the copy of the child data object in the non-transactional data store when processing the query, in some embodiments. If no update for the obtained child objects is identified in the transaction description, then as indicated by the negative exit from 740, an evaluation may be made as to whether the version of the child object(s) is inconsistent with the parent data object, as indicated at 760.

In some circumstances, the parent data object may be inconsistent with child data objects that are obtained for servicing the query. For example, if a new transaction is stored and flushed from the parent data object and applied to child data objects in between obtaining the transaction description, as indicated at 730, and the child data objects, as indicated at 720, then the child data objects may reflect the application of a different transaction that occurred after the query was received. As noted above a comparison of transaction version numbers may be made. If the transaction version number of the child data object is greater than the transaction version number for the parent data object, then the transaction may indicated an inconsistent version of the obtained child objects, as indicated at 760. In some embodiments, inconsistent versions of child data objects may trigger an error response to the query indicating an inconsistent read. However, in embodiments that implement the maintenance of child data object snapshots, as discussed above with regard to FIGS. 5A and 5B, then processing of the query may continue, as indicated by the positive exit from 760.

As indicated at 770, a check may be made to determine whether a snapshot of the inconsistent child data object is maintained that corresponds to a prior version consistent with the transaction description. For example, the transaction version numbers of snapshots of the child data object may be evaluated, if one or more exist with a transaction version number less than or equal to the transaction version number of the parent data object, then the snapshot with the highest transaction version number is used as the consistent version for generating the query results, as indicated at 780. If no snapshot exists or only snapshots exist with transaction version numbers that are greater than the transaction version number of the transaction description, then no consistent snapshot is available, and the child object is excluded from generating the query results, as indicated at 772.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 8:
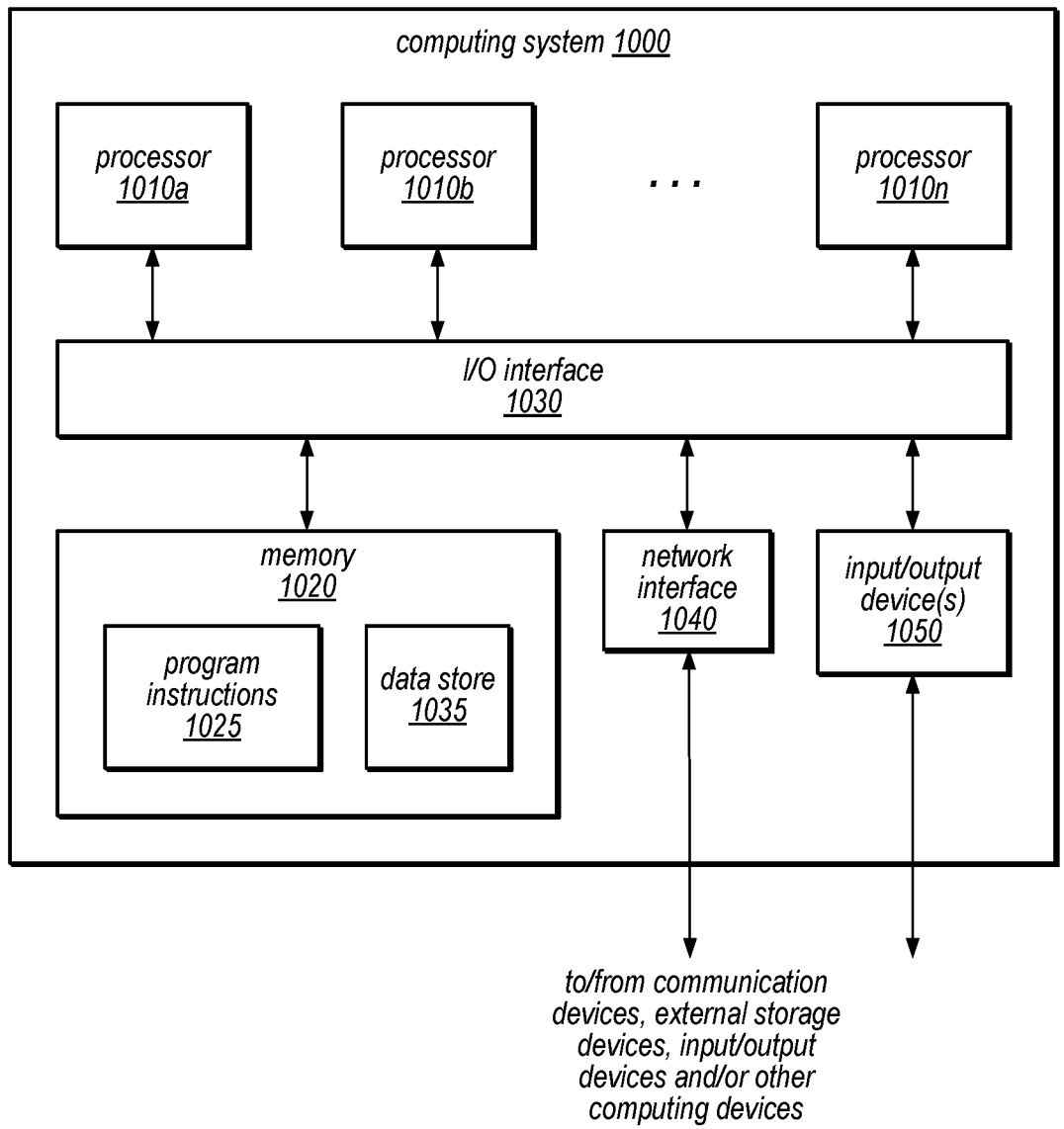
FIG. 8 is a block diagram illustrating an example computing system, according to some embodiments.

Embodiments of executing transactions for a hierarchy of data objects in a non-transactional data store as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

System memory 1020 may be configured to store program instructions 1025 and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, configured to implement the various embodiments of the systems as described herein, and data store 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor cause the system to implement a transaction engine on behalf of a client of a non-relational data store, wherein the non-relational data store maintains a hierarchy of data objects that comprise a parent data object and a plurality of child data objects;
   the transaction engine, configured to:
      receive, from the client, a request to submit a transaction to the non-relational data store that directs one or more updates to one or more of the child data objects of the non-relational data store;
      send a request to the non-relational data store to store a description of the transaction as part of the parent data object, wherein the description of the transaction describes the one or more updates to be applied to the non-relational data store as part of the transaction, and directs the one or more updates to the one or more child data objects;
      receive an acknowledgment from the non-relational data store that indicates that the description of the transaction that directs the one or more updates to the one or more child data objects is successfully stored as part of the parent data object;
      return an indication to the client that the transaction is committed to the hierarchy of data objects;
      subsequent to the return of the indication to the client that the transaction is committed to the hierarchy of data objects of the non-relational data store, evaluate the description of the transaction in the parent data object of the non-relational data store to provide a consistent view of the hierarchy of data objects responsive to a query directed to the hierarchy of data objects, wherein the evaluation determines whether the transaction is applicable to a child data object of the plurality child data objects in the non-relational data store accessed by the query; and
      subsequent to the evaluation of the description of the transaction in the parent data object of the non-relational data store to provide the consistent view of the hierarchy of data objects responsive to the query directed to the hierarchy of data objects, send one or more requests to the non-relational data store to apply at least one of the one or more updates, that are directed by the transaction whose description is stored as part of the parent data object of the non-relational data store, to at least one child data object of the one or more child data objects of the non-relational data store.

2. The system of claim 1,
   wherein to evaluate the description of the transaction in the parent data object of the non-relational data store to provide a consistent view of the hierarchy of data objects responsive to a query directed to the hierarchy of data objects the transaction engine is configured to:
  obtain the one child data object from the non-relational data store that satisfies the query;
  identify one or more changes in the transaction description applicable the one child data object; and
wherein the transaction engine is further configured to:
  apply the one or more changes to the one child data object; and
  return a result for the query based on the obtained child data objects including the one or more changes to the at least one child data object.

3. The system of claim 1, wherein the transaction engine performs the send of the one or more requests to the non-relational data store to apply the one or more updates to the at least one child data object as part of a background process to flush the transaction from the parent data object.

4. The system of claim 1, wherein the transaction engine is further configured to:
  receive, from the client or a different client, a request to submit another transaction directed to the hierarchy of data objects;
  send a request to the non-relational data store to store a description of the other transaction as part of the parent data object;
  receive a failure indication from the non-relational data store for the request to store the description of the other transaction; and
  return a failure indication for the other transaction to the client or the different client.

5. A method, comprising:
performing, by one or more computing devices:
  receiving a transaction directed to a hierarchy of data objects maintained at a non-transactional data store, wherein the hierarchy of data objects comprises a parent data object and a plurality of child data objects, and wherein the transaction comprises directing one or more updates to one or more of the plurality of child data objects of the non-transactional data store;
  storing a description of the transaction as part of the parent data object of the non-transactional data store, wherein the description of the transaction describes the one or more updates to be applied to the hierarchy of data objects as part of the transaction, and comprises directing the one or more updates to the one or more child data objects of the non-transactional data store;
  acknowledging the transaction as committed to the hierarchy of data objects;
  subsequent to the acknowledging of the transaction as committed to the hierarchy of data objects of the non-relational data store, evaluating the description of the transaction, that comprises directing the one or more updates to the one or more child data objects of the non-relational data store, in the parent data object of the non-relational data store to provide a consistent view of the hierarchy of data objects responsive to a query directed to the hierarchy of data objects; and
  subsequent to evaluating the description of the transaction in the parent data object of the non-relational data store to provide the consistent view of the hierarchy of data objects responsive to the query directed to the hierarchy of data objects, applying at least one of the one or more updates to at least one child data object of the one or more child data objects of the non-relational data store.

6. The method of claim 5, wherein the transaction comprises an insertion of a new child data object into the hierarchy of data objects, and wherein the method further comprises:
  prior to storing the description of the transaction, creating the new child data object in the non-transactional data store, wherein the new child data object is identified as uncommitted;
  subsequent to the acknowledgment of the transaction as committed, updating the new child data object to be identified as committed.

7. The method of claim 5, further comprising:
  receiving another transaction directed to the hierarchy of data objects:
    applying the transaction to the hierarchy of data objects according to the description of the transaction read from the parent data object.

8. The method of claim 5, further comprising performing the transaction with respect to the hierarchy of data objects according to the description of the transaction in the parent data object as part of a background process to flush the transaction from the parent data object.

9. The method of claim 5, further comprising:
  receiving another transaction directed to the hierarchy of data objects;
  attempting to apply the transaction to the hierarchy of data objects according to the description of the transaction read from the parent data object; and
  determining that the attempt to apply the transaction to the hierarchy of data objects failed; and
  returning an indication that the other transaction failed.

10. The method of claim 5,
wherein evaluating the description of the transaction in the parent data object of the non-relational data store to provide the consistent view of the hierarchy of data objects responsive to the query directed to the hierarchy of data objects, comprises:
  obtaining the child data object from the non-relational data store that satisfies the query;
  identifying one or more changes in the transaction description applicable to the one child data object; and
wherein the method further comprises:
  applying the one or more changes to the one child data object; and
  returning a result for the query based on the one child data object including the one or more changes to the one child data object.

11. The method of claim 5,
maintaining a plurality of child data object snapshots corresponding to different prior versions of the plurality of child data objects;
wherein evaluating the description of the transaction in the parent data object of the non-relational data store to provide the consistent view of the hierarchy of data objects responsive to the query directed to the hierarchy of data objects, comprises:
  obtaining the child data object from the non-relational data store that satisfies the query;
  determining that a version of the one child data objects is inconsistent with the description of the transaction;
wherein the method further comprises:
  obtaining a snapshot of the plurality of child data object snapshots corresponding to a prior version of the one child data object that is consistent with the description of the transaction; and returning a result for the query based on the one child data objects including the snapshot of the one child data object.

12. The method of claim 11, wherein maintaining the plurality of child data object snapshots, comprises creating new child data object snapshots upon application of transactions directed to the hierarchy of data objects; and wherein the method further comprises removing one or more of the child data object snapshots that exceed a snapshot retention threshold.

13. The method of claim 5, wherein the non-transactional data store is a network-based service, and wherein storing the description of the transaction and evaluating the description of the transaction are performed by generating respective requests formatted according to a network-based interface and sending the respective requests to the network-based service.

14. A non-transitory, computer-readable storage medium, storing program instructions that when executed by one or more computing devices cause the one or more computing devices to implement:

receiving a transaction directed to a hierarchy of data objects maintained at a non-transactional data store, wherein the hierarchy of data objects comprises a parent data object and a plurality of child data objects, and wherein the transaction comprises a direction of one or more updates to one or more of the plurality of child data objects of the non-transactional data store;

sending a request to the non-transactional data store to store a description of the transaction as part of the parent data object of the non-transactional data store, wherein the description of the transaction describes the one or more updates to be applied to the non-transactional data store as part of the transaction, and comprises the direction of the one or more updates to the one or more child data objects of the non-transactional data store;

receiving an acknowledgment of the request to store the description of the transaction, that comprises the direction of the one or more updates to the one or more child data objects of the non-transactional data store, as part of the parent data object of the non-transactional data store;

acknowledging the transaction as committed to the hierarchy of data objects;

subsequent to the acknowledging of the transaction as committed to the hierarchy of data objects of the non-transactional data store, evaluating the description of the transaction, that comprises the direction of the one or more updates to the one or more child data objects of the non-transactional data store, read from the parent data object of the non-transactional data store, to provide a consistent view of the hierarchy of data objects responsive to a query directed to the hierarchy of data objects; and subsequent to evaluating the description of the transaction in the parent data object of the non-transactional data store to provide the consistent view of the hierarchy of data objects responsive to the query directed to the hierarchy of data objects sending one or more requests to the non-transactional data store to apply at least one of the one or more updates to at least one child data object of the one or more child data objects of the non-relational data store.

15. The non-transitory, computer-readable storage medium of claim 14, wherein the program instructions cause the one or more computing devices to further implement:

receiving another transaction directed to the hierarchy of data objects; and applying the transaction to the hierarchy of data objects according to the description of the transaction read from the parent data object.

16. The non-transitory, computer-readable storage medium of claim 15, wherein the transaction comprises a request to delete one of the child data objects, and wherein, in applying the transaction to the hierarchy of data objects, the program instructions cause the one or more computing devices to implement deleting the one child data object.

17. The non-transitory, computer-readable storage medium of claim 14, wherein, in evaluating the description of the transaction, that comprises the direction of the one or more updates to the one or more child data objects of the non-transactional data store, read from the parent data object of the non-transactional data store, to provide a consistent view of the hierarchy of data objects responsive to a query directed to the hierarchy of data objects, the program instructions cause the one or more computing devices to implement:

sending a request to the non-transactional data store to obtain the one child data object from the non-relational data store that satisfies the query;

identifying one or more changes in the transaction description applicable to the one child data object; and wherein the program instructions cause the one or more computing devices to further implement:

applying the one or more changes to the one child data object; and returning a result for the query based on the one child data object including the one or more changes to the at least one child data object.

18. The non-transitory, computer-readable storage medium of claim 17, wherein a previously received transaction comprising an insertion of a new child data object failed to commit, wherein the new child data object was created in the non-transactional data store prior to the failure of the previously received transaction to commit, wherein the new child data object was identified as uncommitted when created in the non-transactional data store, wherein the new child data object is another one of the plurality of child data objects that satisfies the query, and wherein the program instructions further cause the one or more computing devices to implement:

determining that the new child data object is identified as uncommitted; and excluding the new child data object from the result that is returned for the query.

19. The non-transitory, computer-readable storage medium of claim 14, wherein the program instructions cause the one or more computing devices to further implement:

maintaining a plurality of child data object snapshots corresponding to different prior versions of the plurality of child data objects;

wherein, in evaluating the description of the transaction, that comprises the direction of the one or more updates to the one or more child data objects of the non-transactional data store, read from the parent data object of the non-transactional data store, to provide a consistent view of the hierarchy of data objects responsive to a query directed to the hierarchy of data objects, the program instructions cause the one or more computing devices to implement:
  obtaining the one child data object from the non-relational data store that satisfies the query;
  determining that a version of the one child data object is inconsistent with the description of the transaction;
  determining that a snapshot of the plurality of child data object snapshots corresponding to a prior version of the one child data object that is consistent with the description of the transaction is not maintained; and
wherein the program instructions cause the one or more computing devices to further implement:
  returning a result for the query excluding the one child data object.

20. The non-transitory, computer-readable storage medium of claim 14, wherein the one or more computing devices implement a client of the non-transactional data store, wherein the program instructions are a transaction library maintained at the client, wherein the received transaction and the acknowledgment that the transaction are committed are formatted according to a programmatic interface implemented as part of the transaction library, and wherein the request to store the description is formatted according to an interface for the non-transactional data store.

* * * * *